(12) United States Patent
Krishnakumar et al.

(10) Patent No.: US 7,660,591 B1
(45) Date of Patent: Feb. 9, 2010

(54) PROPAGATION LOSS MODEL BASED INDOOR WIRELESS LOCATION OF STATIONS

(75) Inventors: Anjur Sundaresan Krishnakumar, Princeton, NJ (US); Parameshwaran Krishnan, Basking Ridge, NJ (US); Jay Munro Stiles, Watchung, NJ (US)

(73) Assignee: Avaya Inc., Basking Ridge, NJ (US)

( * ) Notice: Subject to any disclaimer, the term of this patent is extended or adjusted under 35 U.S.C. 154(b) by 539 days.

(21) Appl. No.: 11/223,092

(22) Filed: Sep. 9, 2005

(51) Int. Cl.
*H04W 24/00* (2009.01)
*H04W 4/00* (2009.01)
*H04B 17/00* (2006.01)
*H04B 7/00* (2006.01)
*H01Q 3/00* (2006.01)
*G01S 3/02* (2006.01)
*H04L 12/28* (2006.01)
*H04J 3/00* (2006.01)

(52) U.S. Cl. .......... 455/456.5; 455/67.11; 455/423; 455/513; 342/360; 342/465; 370/254; 370/332; 370/336

(58) Field of Classification Search ......... 455/501–506, 455/513, 63.1, 67.13, 67.14, 570, 114.2, 455/115, 135, 225, 226.2, 226.3, 277.2, 278.1, 455/283, 296, 423, 456.1, 456.3, 456.5, 456.6, 455/562.1, 67.7, 67.11, 424, 504, 436, 437, 455/69, 446, 522, 525, 561, 572; 370/254, 370/329, 330, 332, 335, 336, 245; 342/357.06, 342/357.07, 360, 368, 373, 452, 465, 450; 340/506, 514, 539.2

See application file for complete search history.

(56) References Cited

U.S. PATENT DOCUMENTS

| | | | | |
|---|---|---|---|---|
| 5,551,057 A | * | 8/1996 | Mitra | 455/522 |
| 5,809,430 A | * | 9/1998 | D'Amico | 455/525 |
| 6,150,936 A | * | 11/2000 | Addy | 340/539.2 |
| 6,587,690 B1 | * | 7/2003 | Di Huo et al. | 455/446 |
| 2001/0041565 A1 | * | 11/2001 | Vicharelli et al. | 455/423 |
| 2002/0063656 A1 | * | 5/2002 | Gutowski | 342/360 |
| 2002/0168993 A1 | * | 11/2002 | Choi et al. | 455/522 |
| 2005/0285793 A1 | * | 12/2005 | Sugar et al. | 342/465 |
| 2006/0199546 A1 | * | 9/2006 | Durgin | 455/67.11 |

* cited by examiner

*Primary Examiner*—Nay A Maung
*Assistant Examiner*—Paul P Tran
(74) *Attorney, Agent, or Firm*—Chapin IP Law, LLC

(57) ABSTRACT

A method and apparatus for determining a location of a transmitter includes taking a Received Signal Strength (RSSI) measurement at a plurality of locations. Next, a known transmit power is subtracted from each of the RSSI measurements to produce a Propagation Loss Vector (PLV) for each location of the plurality of locations. A model is developed from the PLVs, the model including a plurality of grid points. A candidate Transmit Power Vector (TPV) is produced by subtracting the PLV for a candidate location from the RSSI measurement. Each of the RSSI measurements are matched against each TPV of the model. Once all the grid points have been evaluated, the grid point having a best match is selected as a location of the transmitter.

24 Claims, 6 Drawing Sheets

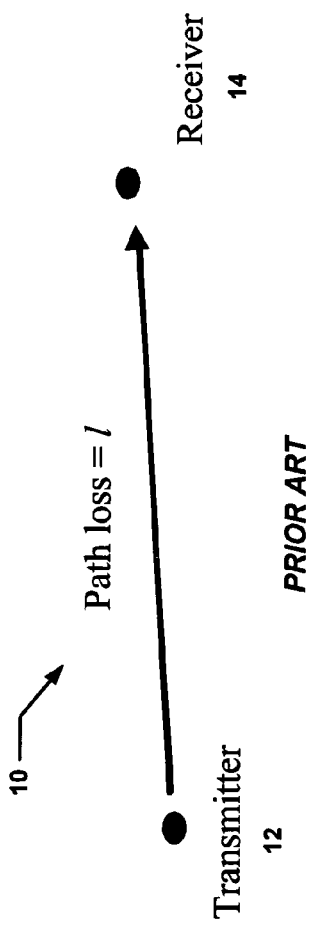
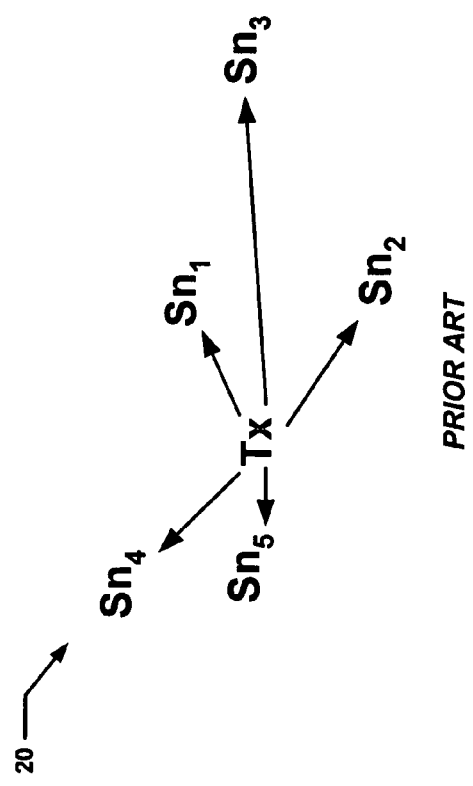

PROPAGATION LOSS MODEL BASED INDOOR WIRELESS LOCATION OF STATIONS

BACKGROUND

With the increasing use of wireless networking, especially 802.11-based wireless systems in enterprise networks, there is now a desire to develop services that provide more than untethered network access. An important class of services includes those services that use end-user location information. Such services include location-aware content delivery, emergency location, services based on the notion of closest resource, and location-based access control. Techniques that can estimate location in indoor environments are important to enable such services in enterprises.

In typical wireless deployments in an enterprise, a site is served by several access points (APs). Client devices associate with an AP to obtain connectivity. Indoor wireless LAN (WLAN) location estimation can employ one of several physical attributes of the medium for estimation. The typical features that might be used are: the received signal strength (RSS) of communication, the angle of arrival of the signal, and the time difference of arrival. Among these, RSS is the only feature that is measurable with reasonably priced current commercial hardware. Related efforts have used RSS for location estimation and concentrated on locating a user in two-dimensional space, e.g., a point on one floor of a site.

Conventional techniques for WLAN location estimation operate in two phases: a model building offline phase, and an online phase where estimation is performed. The model constructed in the offline phase is, essentially, a map of signal strength behavior at the site. The model is either constructed using many measurements at the site, or is parametric and depends on several variables like type and number of walls and other signal obstructers. In the online phase, a set of signal measurements is mapped to a location after "consulting" the model. The accuracy of estimation depends on the technique used to build the model, and the methodology used to match the measured signal strengths to the model.

The deployment of location estimation systems is typically done in either a client-based deployment or an infrastructure-based deployment. In the client-based deployment, the client, in the online phase, measures the signal strengths received from various APs. This information is used to locate the client. In the infrastructure-based deployment, the administrator deploys sniffing devices that monitor clients and the signal strength from clients. This sniffed information is used to locate the clients in the online phase. For ease of management, including provisioning, security, deployment and maintenance, and the fact that no client changes are required, most enterprises tend to prefer the infrastructure-based deployment.

SUMMARY

Conventional mechanisms such as those explained above suffer from a variety of deficiencies. One conventional method involves using Global Positioning Systems (GPS) to determine transmitter location. One deficiency with this GPS approach is that conventional GPS methods cannot be used for performing location estimation since the GPS systems have problems working indoors, due in part to interference from walls and other structures and devices. Conventional client-based approaches have been used, where the transmit power of the client is not an issue, since the measurement of received signal strength is based on signals from the AP (whose transmit power is known to the administrator). Infrastructure-based approaches have also been used. However, the issue of transmit power of clients has not been considered. Not knowing the transmit power of the client is a major problem associated with infrastructure-based approaches.

Deterministic techniques that work in an infrastructure-based deployment (e.g., RADAR systems, and Location Estimation Assisted by Stationary Emitters (LEASE) systems, etc.) use the following approach. During the offline phase, RSSI measurements (as seen by all sniffers) are taken at several points on a floor of a building. The RSSI vector at a point becomes the signature of that point. With RADAR, these signatures become the model, and with LEASE, the RSSI vectors are interpolated in a specific way across a finer grid of points that becomes the model. In the online phase, the observed RSSI vector is matched against the model using a nearest neighbor function to find the best match. The location providing the best match is identified as the location of the terminal. With probabilistic approaches, several RSSI readings are taken at a location to determine an RSSI probability function, and in the online phase a maximum likelihood estimator-based technique is used. All these techniques have been described in terms of RSSI. Since the RSSI is dependent on the transmit power of the terminal, the online phase will provide inaccurate results if the offline phase was conducted using a terminal (or model builder) with a different transmit power.

Embodiments of the invention significantly overcome such deficiencies and provide mechanisms and techniques that provide a method of determining a location of a transmitter.

In a particular embodiment, the method of determining a location of a transmitter includes taking a Received Signal Strength (RSSI) measurement at a plurality of locations. Next, a known transmit power is subtracted from each of the RSSI measurements to produce a Propagation Loss Vector (PLV) for each location of the plurality of locations. A model is developed from the PLVs, the model including a plurality of grid points. A candidate Transmit Power Vector (TPV) is produced by subtracting the PLV for a candidate location from the RSSI measurement. Each of the RSSI measurements are matched against each vector of the model. Once all the grid points have been evaluated, the grid point having a best match is selected as a location of the transmitter.

Another embodiment of a method of determining a location of a transmitter includes taking a Received Signal Strength (RSSI) measurement at a plurality of locations and developing a model from the RSSI measurements, the model including a plurality of grid points. A known transmit power is subtracted from each of the RSSI measurements to produce a Propagation Loss Vector (PLV) for each location of the plurality of locations. Next, a candidate Transmit Power Vector (TPV) is produced by subtracting the PLV for a candidate location from the RSSI measurement. Each of the RSSI measurements are matched against each vector of the model. Once all the grid points have been evaluated, the grid point having a best match is selected as a location of the transmitter.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that determines a location of a transmitter as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations determining a location of a transmitter as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a prior art diagram showing path loss between a transmitter and receiver;

FIG. 2, is a prior art diagram showing a transmitter and a plurality of sniffers;

DETAILED DESCRIPTION

Figure 3A:
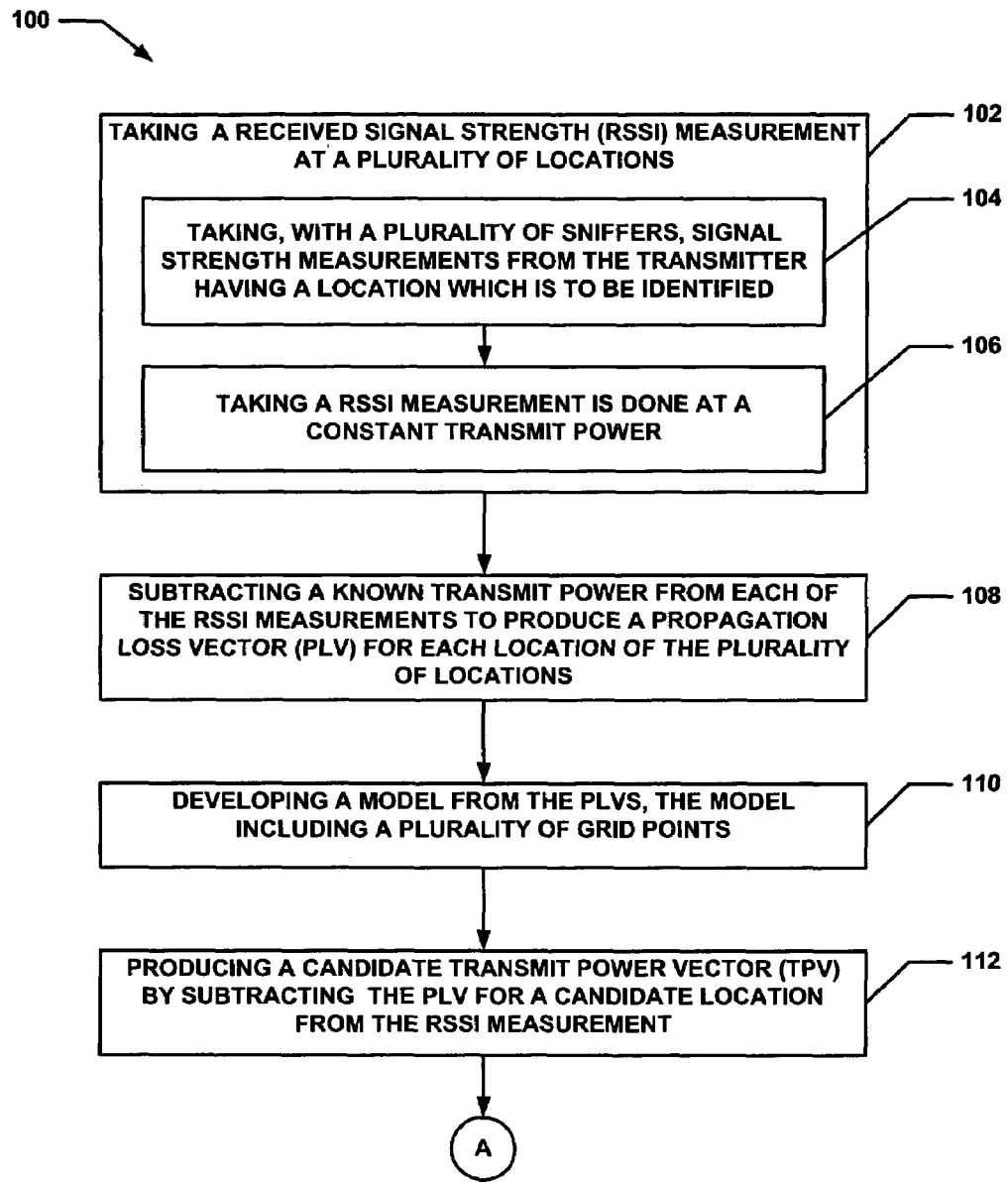
FIGS. 3A and 3B are a flow diagram of a particular embodiment of a first method of determining a location of a transmitter.

Embodiments of an infrastructure-based technique for determining a location of a transmitter, independent of the transmitter's transmit power are presented. Referring to FIG. 1, a transmitter 12 transmits at a given power level p1. If the path loss between the transmitter and receiver is l, the signal strength as viewed by the receiver is p1-$l$. Now, if the transmit power is p2, the received signal strength would be p2-$l$. Clearly, if a model is built based on measurements done with a terminal transmitting at p1 is used for estimating the location of a terminal transmitting with power level p2, inaccuracies occur.

Referring now to FIG. 2, a transmitter (Tx) transmits to several sniffers ($Sn_1$-$Sn_5$) In this embodiment, the signature of a location with prior techniques would be (p1-l1, p1-l2, . . . p1-$ln$), where l1, l2, . . . ln are the path losses to n sniffers. If during the online phase, the observed RSSI vector is exactly (p1-l1, p1-l2, . . . , p1-$ln$), the vector difference in the L2 norm with the model for this location will be 0. However, with a power level of p2, the observed RSSI vector will be (p2-l1, p2-l2, . . . , p2-$ln$) resulting in a vector difference of sqrt(n* (p2−p1)^2). The model could have accounted for this difference if p2 were known, however p2 is unknown.

A particular embodiment of a method which simultaneously estimates the transmit power and the location of the transmitter is disclosed. This approach uses the propagation loss vector (PLV), (l1, l2, . . . , ln), as the signature. Thus, during the model-building phase, the known transmit power is subtracted from the RSSI measurements to generate the PLV. The model is built using the techniques described in prior art (e.g., RADAR, LEASE) but using PLV values instead of RSSI vectors. During the online phase, the estimation methodology is performed.

In the online phase, the measured RSSI vector is (s1, s2, . . . , sn). These are the signal strengths received at the different sniffers from the transmitter whose location is to be determined. A candidate transmit power vector is computed by subtracting the PLV for a candidate location from the RSSI vector. Each of the RSSI measurements are matched against each TPV of the model; and a determination is made regarding whether all grid points have been evaluated. When all the grid points have not been evaluated then the matching for another grid point is repeated, and when all grid points have been evaluated then a grid point having a best match is selected as a location of the transmitter.

In a particular embodiment, the matching may comprise computing the mean and the sum of deviations of each component of the candidate transmit power vector from this mean (this is the least squares estimate and the residual of the assumed constant power at which the transmitter is operating). Further, the choosing of a grid point comprises choosing the grid location that has the least residual. The mean value of the candidate power vector at this location is the estimate of the transmit power. This technique does not require that the transmitter at the unknown location operate at a fixed, albeit unknown, power all the time. The only requirement is that the transmit power remain relatively constant during the small interval when the RSSI measurements are collected. This is typically the case in practice. Thus, the present technique is applicable in environments where power control is utilized. Power control may be used for many reasons, e.g. interference minimization, capacity improvement and the like.

A variation of this approach involves building the model using measured RSSI values (as in prior art). However, during the online phase, the estimation methodology described above is used. Each of the RSSI measurements are matched against each TPV of the model; and a determination is made regarding whether all grid points have been evaluated. When all the grid points have not been evaluated then the matching for another grid point is repeated, and when all grid points have been evaluated then a grid point having a best match is selected as a location of the transmitter. In a particular embodiment, the matching may comprise computing the mean and the sum of deviations of each component of the candidate transmit power vector from this mean. Further, the choosing of a grid point comprises choosing the grid location that has the least residual. The mean value of the candidate power vector at this location is the estimate of the transmit power. That is, in this case, the mean value of the candidate transmit power vector described above is actually the difference between the actual transmit power and the transmit power used during the modeling phase.

A flow chart of particular embodiments of the presently disclosed methods are depicted in FIGS. 3A-3B and 4A-4B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3B:
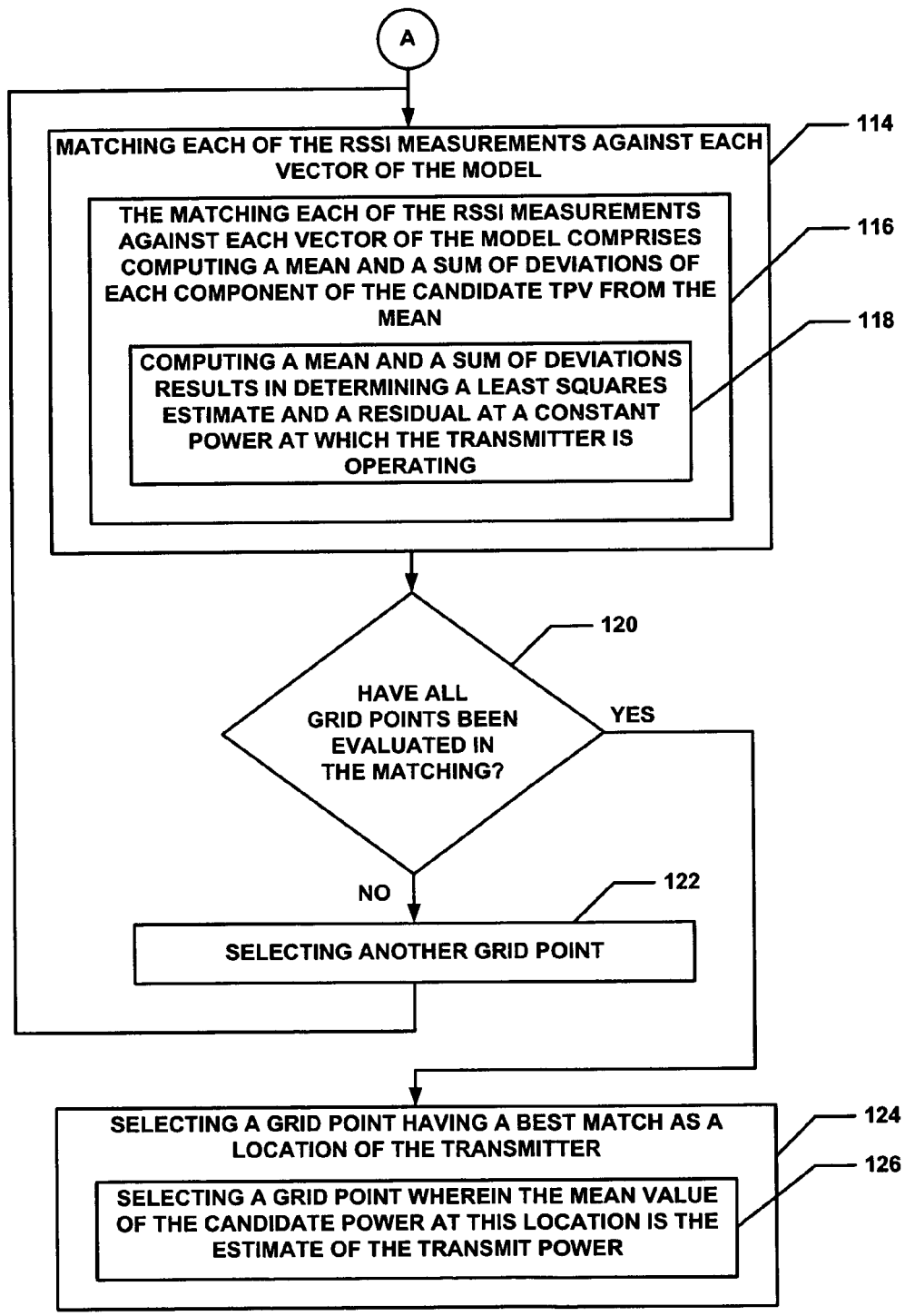

Referring now to FIGS. 3A and 3B, a particular embodiment of a method 100 of determining a location of a transmitter is presented. The method begins with processing block 102 wherein a Received Signal Strength (RSSI) measurement is taken at a plurality of locations. As shown in processing block 104, the measurements may be taken with a plurality of sniffers, and are taken from the transmitter having a location which is to be identified. As recited in processing block 106, the taking of RSSI measurements is done at a relatively constant transmit power.

In processing block 108, a known transmit power is subtracted from each of the RSSI measurements. This produces a Propagation Loss Vector (PLV) for each location of the plurality of locations.

As shown in processing block 110, a model is developed from the PLVs. The model may include a plurality of grid points. The grid points do not necessarily coincide with the locations of the sniffers or the transmitter.

In processing block 112, a candidate Transmit Power Vector (TPV) is produced by subtracting the PLV for a candidate location from the RSSI measurement.

In processing block 114, each of the RSSI measurements is matched against each TPV of the model. As recited in processing block 116, a mean and a sum of deviations of each component of the candidate TPV from the mean are computed. In processing block 118, the computing in processing block 116 results in determining a least squares estimate and a residual at a constant power at which the transmitter is operating.

In decision block 120, a determination is made whether all grid points have been evaluated in the matching. When all the grid points have not been evaluated then processing proceeds at processing block 122 et. seq. When all the grid points have been evaluated then processing continues at processing block 124.

In processing block 122, when al the grid points have not yet been evaluated, then another grid point is selected, and processing begins again at processing block 114 et seq.

In processing block 124, when all grid points have been evaluated, a grid point having a best match is selected as the location of the transmitter. As shown in processing block 126, the selection of a grid point may comprises selecting a grid point wherein the mean value of the candidate power at this location is the estimate of the transmit power.

Figure 4A:
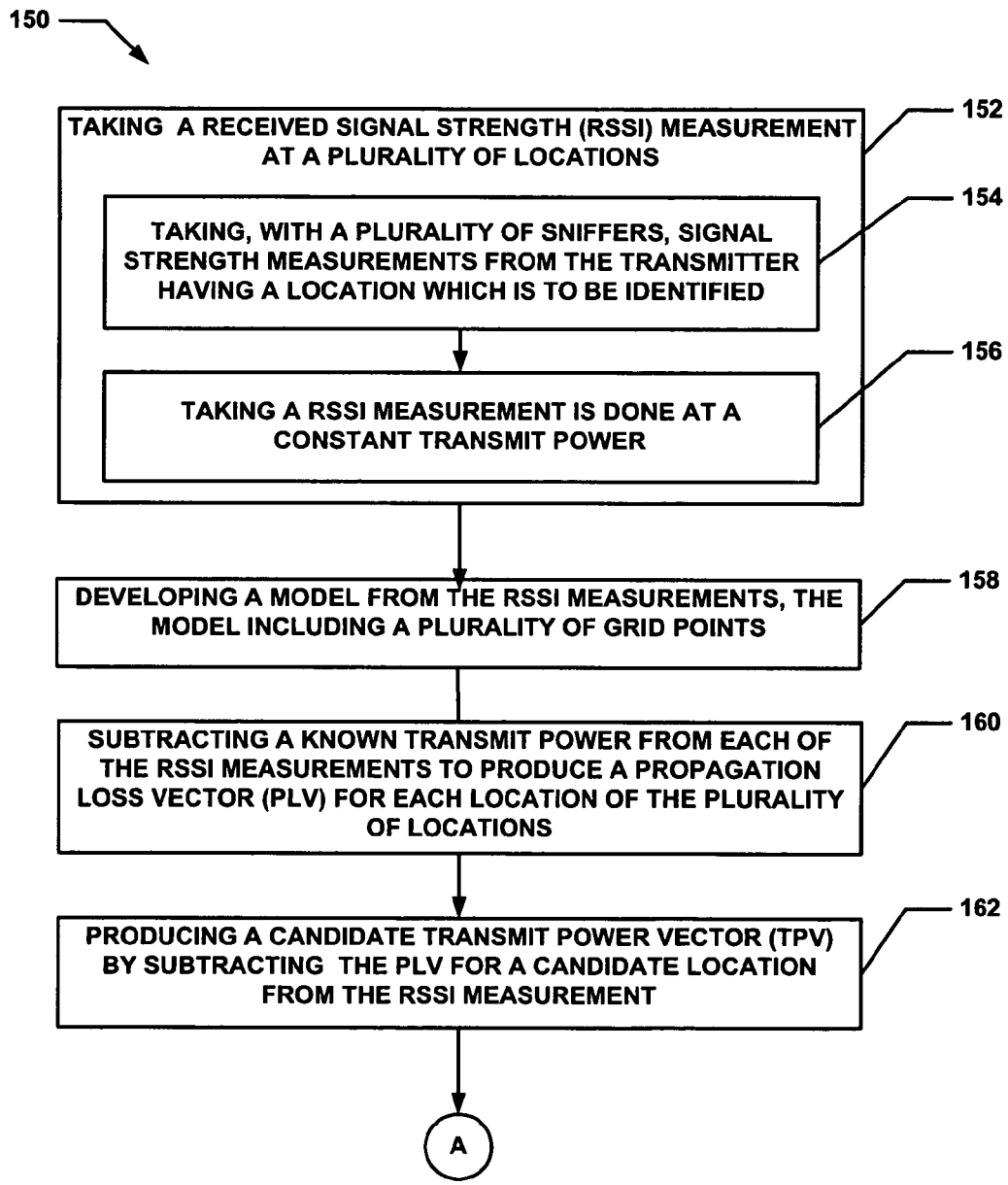
FIGS. 4A and 4B are a flow diagram of a particular embodiment of a second method of determining a location of a transmitter.
Figure 4B:
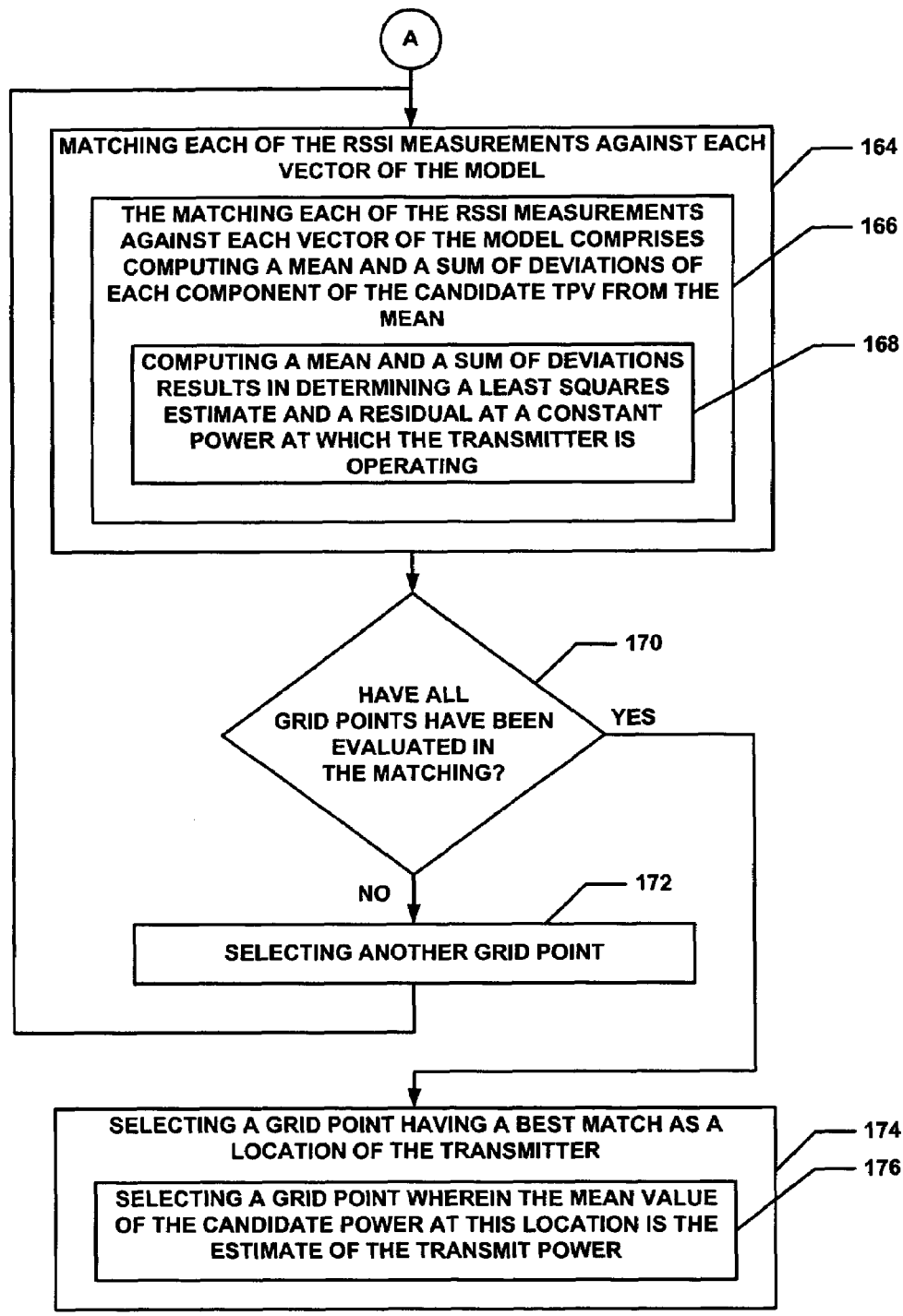

Referring now to FIGS. 4A-4B another embodiment of a method 150 of determining a location of a transmitter is presented. The method 150 begins with processing block 152 wherein a Received Signal Strength (RSSI) measurement is taken at a plurality of locations. As shown in processing block 154, the measurements may be taken with a plurality of sniffers, and are taken from the transmitter having a location which is to be identified. As recited in processing block 156, the taking of RSSI measurements is done at a constant transmit power.

As shown in processing block 158, a model is developed from the RSSI measurements. The model may include a plurality of grid points. The grid points do not necessarily coincide with the locations of the sniffers or the transmitter.

In processing block 160, a known transmit power is subtracted from each of the RSSI measurements. This produces a Propagation Loss Vector (PLV) for each location of the plurality of locations.

In processing block 162, a candidate Transmit Power Vector (TPV) is produced by subtracting the PLV for a candidate location from the RSSI measurement.

In processing block 164, each of the RSSI measurements is matched against each vector of the model. As recited in processing block 166, a mean and a sum of deviations of each component of the candidate TPV from the mean are computed. In processing block 66, the computing in processing block 164 results in determining a least squares estimate and a residual at a constant power at which the transmitter is operating.

In decision block 170, a determination is made whether all grid points have been evaluated in the matching. When all the grid points have not been evaluated then processing proceeds at processing block 172 et. seq. When all the grid points have been evaluated then processing continues at processing block 174.

In processing block 172, when al the grid points have not yet been evaluated, then another grid point is selected, and processing begins again at processing block 162 et seq.

In processing block 174, when all grid points have been evaluated, a grid point having a best match is selected as the location of the transmitter. As shown in processing block 176, the selection of a grid point may comprises selecting a grid point wherein the mean value of the candidate power at this location is the estimate of the transmit power.

Figure 5:
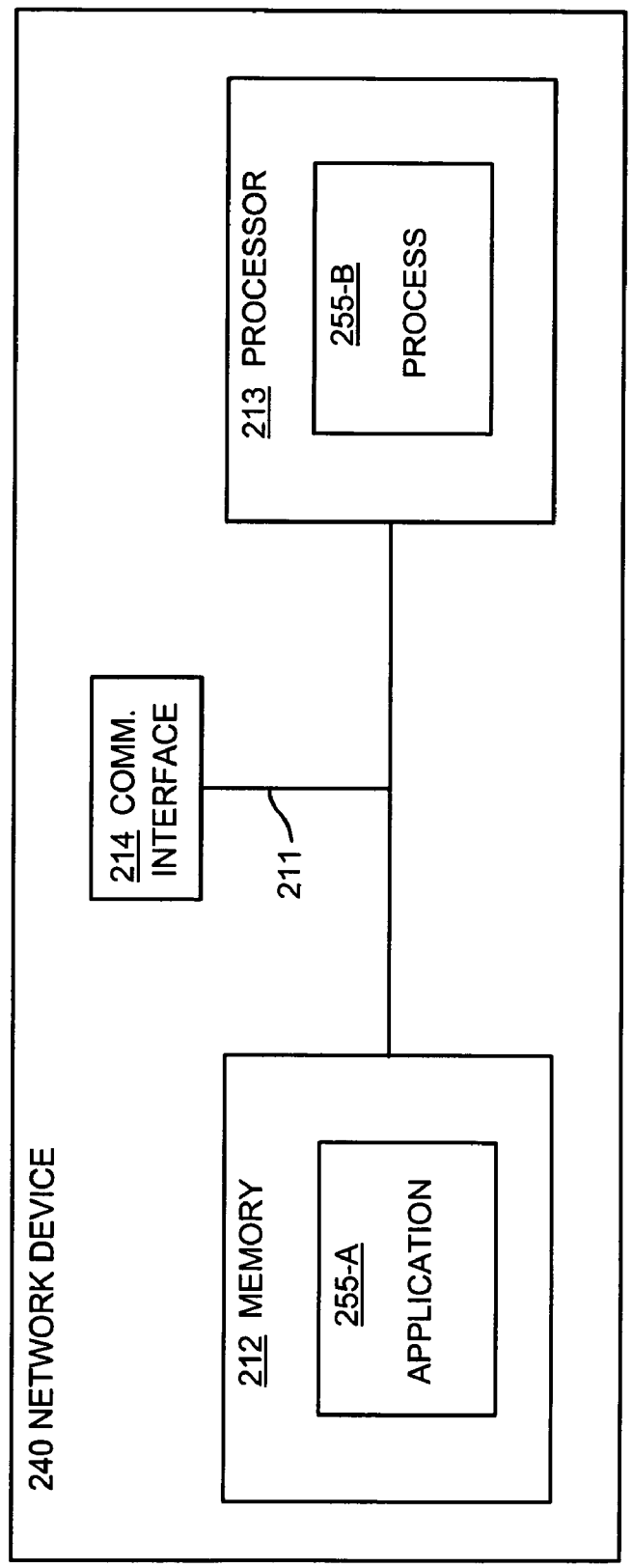
FIG. 5 illustrates an example computer system architecture for a computer system that determines a location of a transmitter in accordance with embodiments of the invention.

FIG. 5 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the agent application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of determining a location of a transmitter comprising:
    taking a Received Signal Strength (RSSI) measurement at a plurality of locations;
    subtracting a known transmit power from each of said RSSI measurements to produce a Propagation Loss Vector (PLV) for each location of said plurality of locations;
    developing a model from said PLVs, said model including a plurality of grid points;
    producing a candidate Transmit Power Vector (TPV) by subtracting the PLV for a candidate location from each of said RSSI measurements;
    matching each of said RSSI measurements against each TPV of said model; and
    determining if all grid points have been evaluated in said matching and when all the grid points have not been evaluated then repeating said matching for another grid point, and when all grid points have been evaluated then selecting a grid point having a best match as a location of said transmitter.

2. The method of claim 1 wherein said taking a RSSI measurement comprises taking, with a plurality of sniffers, signal strength measurements from the transmitter having a location which is to be identified.

3. The method of claim 1 wherein said matching each of said RSSI measurements against each vector of said model comprises computing a mean and a sum of deviations of each component of said candidate TPV from said mean.

4. The method of claim 3 wherein said computing a mean and a sum of deviations results in determining a least squares estimate and a residual at a constant power at which said transmitter is operating.

5. The method of claim 1 wherein said selecting a grid point comprises selecting a grid point wherein the mean value of the candidate power at this location is the estimate of the transmit power.

6. The method of claim 1 wherein said taking a RSSI measurement is done at a constant transmit power.

7. A method of determining a location of a transmitter comprising:
    taking a Received Signal Strength (RSSI) measurement at a plurality of locations;
    developing a model from said RSSI measurements, said model including a plurality of grid points;
    subtracting a known transmit power from each of said RSSI measurements to produce a Propagation Loss Vector (PLV) for each location of said plurality of locations;
    producing a candidate Transmit Power Vector (TPV) by subtracting the PLV for a candidate location from each of said RSSI measurements;
    matching each of said RSSI measurements against each TPV of said model; and
    determining if all grid points have been evaluated in said matching and when all the grid points have not been evaluated then repeating said matching for another grid point, and when all grid points have been evaluated then selecting a grid point having a best match as a location of said transmitter.

8. The method of claim 7 wherein said taking a RSSI measurement comprises taking, with a plurality of sniffers, signal strength measurements from the transmitter having a location which is to be identified.

9. The method of claim 7 wherein said matching each of said RSSI measurements against each vector of said model comprises computing a mean and a sum of deviations of each component of said candidate TPV from said mean.

10. The method of claim 9 wherein said computing a mean and a sum of deviations results in determining a least squares estimate and a residual at a constant power at which said transmitter is operating.

11. The method of claim 7 wherein said selecting a grid point comprises selecting a grid point wherein the mean value of the candidate power at this location is the difference between an actual transmit power and a transmit power used during said taking a RSSI measurement.

12. The method of claim 7 wherein said taking a RSSI measurement is done at a constant transmit power.

13. A computer system comprising:
    a memory;
    a processor;
    a communications interface;

an interconnection mechanism coupling the memory, the processor and the communications interface; and wherein the memory is encoded with an application for determining a location of a transmitter that when performed on the processor, provides a process for processing information, the process causing the computer system to perform the operations of:

taking a Received Signal Strength (RSSI) measurement at a plurality of locations;

subtracting a known transmit power from each of said RSSI measurements to produce a Propagation Loss Vector (PLV) for each location of said plurality of locations;

developing a model from said PLVs, said model including a plurality of grid points;

producing a candidate Transmit Power Vector (TPV) by subtracting the PLV for a candidate location from each of said RSSI measurements;

matching each of said RSSI measurements against each TPV of said model; and determining if all grid points have been evaluated in said matching and when all the grid points have not been evaluated then repeating said matching for another grid point, and when all grid points have been evaluated then selecting a grid point having a best match as a location of said transmitter.

14. The computer system of claim 13 wherein said taking a RSSI measurement comprises taking, with a plurality of sniffers, signal strength measurements from the transmitter having a location which is to be identified.

15. The computer system of claim 13 wherein said matching each of said RSSI measurements against each vector of said model comprises computing a mean and a sum of deviations of each component of said candidate TPV from said mean.

16. The computer system of claim 15 wherein said computing a mean and a sum of deviations results in determining a least squares estimate and a residual at a constant power at which said transmitter is operating.

17. The computer system of claim 13 wherein said selecting a grid point comprises selecting a grid point wherein the mean value of the candidate power at this location is the estimate of the transmit power.

18. The computer system of claim 13 wherein said taking a RSSI measurement is done at a constant transmit power.

19. A computer system comprising:
a memory;
a processor;
a communications interface;
an interconnection mechanism coupling the memory, the processor and the communications interface; and
wherein the memory is encoded with an application for determining a location of a transmitter that when performed on the processor, provides a process for processing information, the process causing the computer system to perform the operations of:

taking a Received Signal Strength (RSSI) measurement at a plurality of locations;

developing a model from said RSSI measurements, said model including a plurality of grid points;

subtracting a known transmit power from each of said RSSI measurements to produce a Propagation Loss Vector (PLV) for each location of said plurality of locations;

producing a candidate Transmit Power Vector (TPV) by subtracting the PLV for a candidate location from each of said RSSI measurements;

matching each of said RSSI measurements against each vector of said model; and determining if all grid points have been evaluated in said matching and when all the grid points have not been evaluated then repeating said matching for another grid point, and when all grid points have been evaluated then selecting a grid point having a best match as a location of said transmitter.

20. The computer system of claim 19 wherein said taking a RSSI measurement comprises taking, with a plurality of sniffers, signal strength measurements from the transmitter having a location which is to be identified.

21. The computer system of claim 19 wherein said matching each of said RSSI measurements against each vector of said model comprises computing a mean and a sum of deviations of each component of said candidate TPV from said mean.

22. The computer system of claim 21 wherein said computing a mean and a sum of deviations results in determining a least squares estimate and a residual at a constant power at which said transmitter is operating.

23. The computer system of claim 19 wherein said selecting a grid point comprises selecting a grid point wherein the mean value of the candidate power at this location is the difference between an actual transmit power and a transmit power used during said taking a RSSI measurement.

24. The computer system of claim 19 wherein said taking a RSSI measurement is done at a constant transmit power.

* * * * *